(12) United States Patent
Benninghoff et al.

(10) Patent No.: US 12,384,923 B2
(45) Date of Patent: *Aug. 12, 2025

(54) METHOD OF TREATMENT OF A SURFACE

(71) Applicant: Conopco, Inc., Englewood Cliffs, NJ (US)

(72) Inventors: Jens Carlo Benninghoff, Dortmund (DE); Panagiotis Kotsakis, Athens (GR); Neil James Parry, Tarporley (GB)

(73) Assignee: Conopco, Inc., Englewood Cliffs, NJ (US)

( * ) Notice: Subject to any disclaimer, the term of this patent is extended or adjusted under 35 U.S.C. 154(b) by 597 days.

This patent is subject to a terminal disclaimer.

(21) Appl. No.: 17/291,038

(22) PCT Filed: Oct. 23, 2019

(86) PCT No.: PCT/EP2019/078936
§ 371 (c)(1),
(2) Date: May 4, 2021

(87) PCT Pub. No.: WO2020/094402
PCT Pub. Date: May 14, 2020

(65) Prior Publication Data
US 2021/0371674 A1    Dec. 2, 2021

(30) Foreign Application Priority Data

Nov. 8, 2018   (EP) .................... 18205127

(51) Int. Cl.
| | | |
|---|---|---|
| A01N 43/36 | (2006.01) | |
| C09D 5/14 | (2006.01) | |
| C09D 5/16 | (2006.01) | |
| C09D 7/63 | (2018.01) | |
| C08K 5/3415 | (2006.01) | |

(52) U.S. Cl.
CPC ............. *C09D 5/1625* (2013.01); *C09D 5/14* (2013.01); *C09D 7/63* (2018.01); *A01N 43/36* (2013.01); *C08K 5/3415* (2013.01)

(58) Field of Classification Search
CPC .......... C09D 5/1625; C09D 7/63; C09D 5/14; C09D 5/16; C09D 5/1606; A01N 43/46; A01N 43/36; C08K 5/3415
See application file for complete search history.

(56) References Cited

U.S. PATENT DOCUMENTS

| | | | |
|---|---|---|---|
| 5,332,757 | A | 7/1994 | Bird |
| 5,948,917 | A | 9/1999 | Adachi |
| 9,586,901 | B2 | 3/2017 | Kumar et al. |
| 9,682,953 | B2 | 6/2017 | Kharul et al. |
| 9,957,396 | B2 | 5/2018 | Huen et al. |
| 2003/0162924 | A1 | 8/2003 | Vos et al. |
| 2003/0162942 | A1 | 8/2003 | Maclennan et al. |
| 2010/0035948 | A1 | 2/2010 | Kumar et al. |
| 2015/0351393 | A1 | 12/2015 | Parry et al. |
| 2017/0096391 | A1 | 4/2017 | Kumar et al. |
| 2018/0220643 | A1 | 8/2018 | Price |
| 2018/0228152 | A1 | 8/2018 | Parry et al. |
| 2018/0228153 | A1 | 8/2018 | Price |

FOREIGN PATENT DOCUMENTS

| | | |
|---|---|---|
| AU | 2019374439 A1 | 5/2021 |
| CN | 101287805 A | 10/2008 |
| CN | 101389615 A | 3/2009 |
| CN | 101410372 A | 4/2009 |
| CN | 103958473 A | 7/2014 |
| CN | 105017217 A | 11/2015 |
| CN | 105050393 A | 11/2015 |
| CN | 105295558 A | 2/2016 |
| CN | 107920977 A | 4/2018 |
| CN | 107920979 A | 4/2018 |
| CN | 108024938 A | 5/2018 |
| CN | 108024939 A | 5/2018 |
| CN | 108658973 | 10/2018 |
| IN | 201721003508 | 8/2018 |
| WO | WO-1983003804 A1 * | 11/1983 |
| WO | 2007030389 A2 | 3/2007 |
| WO | WO2007030389 | 3/2007 |
| WO | WO2007085042 | 8/2007 |

(Continued)

OTHER PUBLICATIONS

E.Yasser, A. Adli, Toxicity of Single and Mixtures of Antibiotics to Cyanobacteria, 2015, Journal of Envrionmental & Analytical Toxicology, V5:13, (Year: 2015).*
Serena1121 Polyethylene Boat Vs. Fiberglass Boat [retrieved from the internet on Apr. 18, 2024 from <URL:https://tankplastic.wordpress.com/2013/08/24/polyethylene-boat-vs-fiberglass-boat/>] (Year: 2013).*
Schoch CL, et al. NCBI Taxonomy: a comprehensive update on curation, resources and tools. Database (Oxford). 2020 (Year: 2020).*
Kientz B, Vukusic P, Luke S, Rosenfeld E. Iridescence of a marine bacterium and classification of prokaryotic structural colors. Appl Environ Microbiol. Apr. 2012;78(7):2092-9. doi: 10.1128/AEM.07339-11 (Year: 2012).*

(Continued)

*Primary Examiner* — Bryan D. Ripa
*Assistant Examiner* — Marites A Guino-O Uzzle
(74) *Attorney, Agent, or Firm* — Carter, DeLuca & Farrell, LLP; George Likourezos; Bret P. Shapiro

(57) ABSTRACT

The invention relates to a method of treatment of a surface to improve the resistance of the surface to fouling from a photosynthetic species, the method comprising treatment of a surface prone to fouling from a photosynthetic organism with a composition comprising a lactam, wherein the composition comprises from 0.0001 to 5 wt. % of a lactam; and, wherein the surface to be treated is selected from metal, plastic or composites; and to the use of the lactam to inhibit growth of a photosynthetic organism on a surface, wherein the surface to be treated is selected from metal, plastic or composites.

6 Claims, 1 Drawing Sheet

(56) References Cited

FOREIGN PATENT DOCUMENTS

| WO | 2017029070 | A1 | 2/2017 | |
|---|---|---|---|---|
| WO | 2017029093 | A1 | 2/2017 | |
| WO | 2017029104 | A1 | 2/2017 | |
| WO | WO2017029093 | | 2/2017 | |
| WO | WO2017029112 | | 2/2017 | |
| WO | WO2017029118 | | 2/2017 | |
| WO | WO-2017029118 | A1 * | 2/2017 | ............ A01N 25/02 |
| WO | WO2018091222 | | 5/2018 | |

OTHER PUBLICATIONS

Von R. Scheffold Und P. Dubs; Synthese von Azaprotoanemoninen; Helvetica Chimica Acta; 1967; pp. 798-808.

Kalaitzakis et al.; Methylene Blue as a Photosensitizer and Redox Agent: Synthesis of 5-Hydroxy-1H-pyrrol-2(5H)-ones from Furans; Angewandte Chemie; 2015; pp. 6283-6287; 54. issue.

Dittami et al.; Preparation of N-Alkyl Pyrrolidinones via Photocyclization of y-Keto-a,B-Unsaturated Amides; Tetrahedron letters; 1995; pp. 4197-4420; vol. 36 No. 24.

Search Report and Written Opinion in EP18205110; Feb. 15, 2019.
Search Report and Written Opinion in EP18205127; Apr. 18, 2019.
Search Report and Written Opinion in EP18205274; Apr. 18, 2019.
Search Report and Written Opinion in PCTEP2019078948; Nov. 26, 2019.
Search and Written Opinion in PCTEP2019078936; Mar. 11, 2020.
Search Report and Written Opinion in PCTEP2019080236; Mar. 11, 2020.
IPRP2 in PCTEP2019078936; Sep. 25, 2020.
Written Opinion in PCTEP2019078948; Oct. 7, 2020.
IPRP2 in PCTEP2019078948; Feb. 1, 2021.
Written Opinion in PCTEP2019080236; Sep. 18, 2020.
Tran et al., "Experimental and Theoretical Damage Assessment in Advance Marine Composites" Marine Composites, Jan. 2019, pp. 55-84.
Latha et al., "Formulation and Evaluation of Capecitabine Nanoparticles for Cancer Therapy", International Journal of Biological & Pharmaceutical Research, Jan. 2012, pp. 477-487.

* cited by examiner t0  t5  t12 t9  t12 t0  t3  t6

METHOD OF TREATMENT OF A SURFACE

FIELD OF INVENTION

The invention relates to a method of treatment of a surface.

BACKGROUND OF THE INVENTION

Surfaces are prone to be attacked by organisms. Some surfaces can be prone to attack to organisms that create unwanted biofilms on the surfaces. This can be described as fouling of the surface.

There is a need to improve the resistance of surfaces to fouling, particularly from photosynthetic organisms, for example organisms found in marine environments such as algae.

SUMMARY OF THE INVENTION

We have found that treatment of a surface with a lactam improves the resistance of the surface to fouling from a photosynthetic species. The lactam inhibits growth of a photosynthetic organism on a surface.

The invention relates in a first aspect to a method of treatment of a surface to improve the resistance of the surface to fouling from a photosynthetic species, the method comprising treatment of a surface prone to fouling from a photosynthetic organism with a composition comprising a lactam, wherein the composition comprises from 0.0001 to 5 wt. % of a lactam; wherein the surface to be treated is selected from metal, plastic or composites.

Preferably the lactam is present at a level of from 0.0001 to 2.5 wt. %, preferably from 0.0001 to 1 wt. %, more preferably from 0.001 to 1 wt. %.

Preferably the photosynthetic organism is prokaryotic or eukaryotic, preferably the prokaryotic organism is cyanobacteria; preferably the eukaryotic organism is algae.

Most preferably the photosynthetic organism is algae.

Preferably the lactam is of formula (I) or (II):

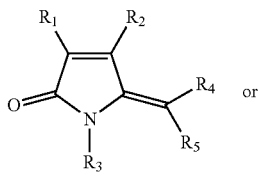

(I)

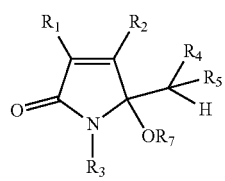

(II)

wherein:
$R_1$ and $R_2$ are each independently selected from hydrogen, halogen, alkyl, cycloalkyl, alkoxy, oxoalkyl, alkenyl, heterocyclyl, heteroaryl, aryl and aralalkyl; and
$R_3$ is selected from hydrogen, hydroxyl, alkyl, cycloalkyl, alkoxy, oxoalkyl, alkenyl, heterocyclyl, heteroaryl, cycloalkyl, aryl, aralalkyl, $-C(O)CR_6=CH_2$, and $(CH_2)_nN^+(R^a)_3$, where n is an integer from 1 to 16, preferably 2 to 8, and where each $R^a$ is independently H or $C_{1-4}$ alkyl;
$R_4$ and $R_5$ are independently selected from hydrogen, aryl, heterocyclyl, heteroaryl, and arylalkyl; and
$R_6$ is selected from hydrogen and methyl; and
$R_7$ is selected from hydrogen and $-C(O)CR_6=CH_2$; and preferably, at least one of $R_4$ and $R_5$ is hydrogen.

Preferably the lactam of formula (I) or (II), $R_1$, $R_4$ and $R_5$ are H; $R_3$ is H, or $(CH_2)_nN^+(CH_3)_3$, where n is an integer from 1 to 16, preferably 2 to 8; and $R_2$ is a phenyl group, or a mono-substituted phenyl group; preferably $R_2$ is selected from phenyl, 4-fluorophenyl, 2-fluorophenyl, 4-chlorophenyl, 3-chlorophenyl, 4-bromophenyl and 4-methylphenyl.

Preferably the lactam is a lactam selected from:

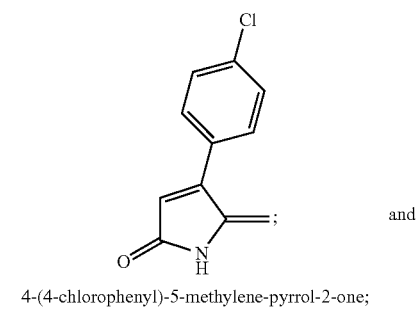 and 4-(4-chlorophenyl)-5-methylene-pyrrol-2-one;

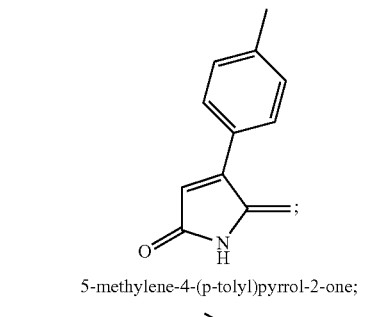

5-methylene-4-(p-tolyl)pyrrol-2-one;

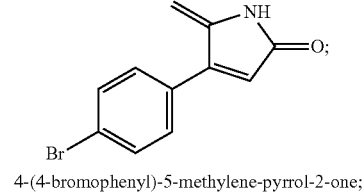

4-(4-bromophenyl)-5-methylene-pyrrol-2-one;

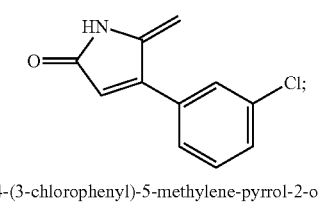

4-(3-chlorophenyl)-5-methylene-pyrrol-2-one;

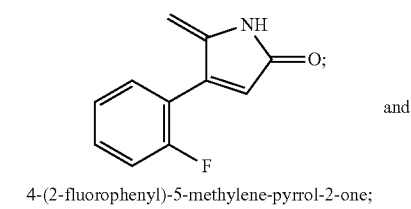 and 4-(2-fluorophenyl)-5-methylene-pyrrol-2-one;

-continued

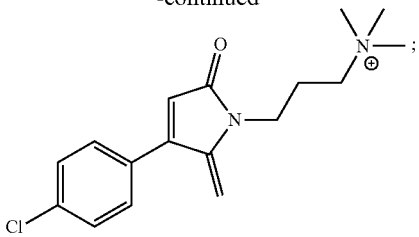

3-(3-4-chlorophenyl)-2-methylene-5-oxo-2,5-dihydro-1H-pyrrol-1-yl)-N,N,
N-trimethylpropan-1-aminium (either as cation itself or with a suitable
counterion, e.g. iodide.

More preferably the lactam is a lactam selected from:

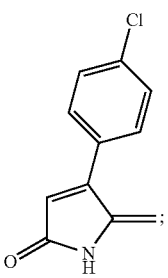

4-(4-chlorophenyl)-5-methylene-pyrrol-2-one;

and

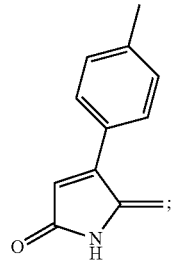

5-methylene-4-(p-tolyl)pyrrol-2-one.

Most preferably the lactam is:

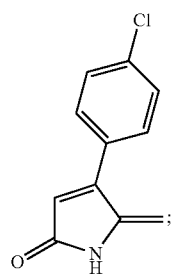

4-(4-chlorophenyl)-5-methylene-pyrrol-2-one.

Preferably the lactam is delivered from an aqueous based composition, or an organic solvent based composition.

In a second aspect, the invention relates to the use of a lactam to inhibit growth of a photosynthetic organism on a surface; wherein the surface to be treated is selected from metal, plastic or composites.

Preferably, the photosynthetic organism is prokaryotic or eukaryotic, preferably the prokaryotic organism is cyanobacteria; preferably the eukaryotic organism is algae.

Preferably, the photosynthetic organism is algae.

Preferably the lactam is as described above in relation to the first aspect of the invention.

DETAILED DESCRIPTION OF THE INVENTION

Figure 1:
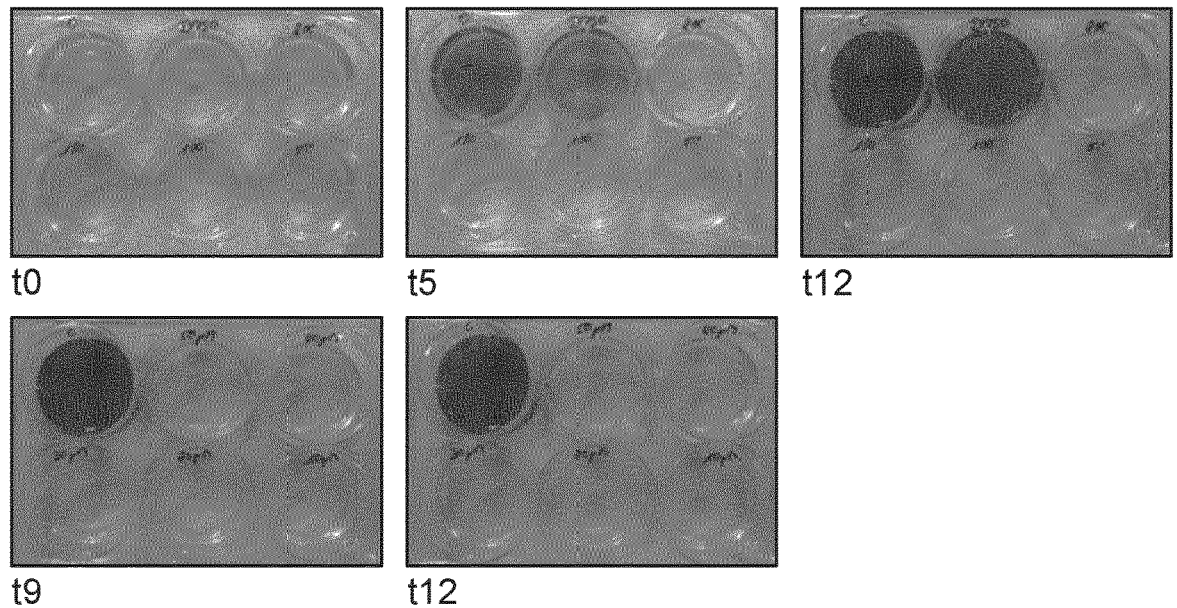
FIG. 1 relates to example 2 and is a picture combining photographs of algal cultures at 0, 5 and 12 days for the specific levels of lactam of 50 μM, 100 μM, 150 μM, 200 μM, as well as the untreated control and DMSO control; and photographs of algal cultures at 9 and 12 days for the specific levels of lactam of 10 μM, 20 μM, 30 μM, 40 μM, 50 μM as well as the untreated control.

The indefinite article "a" or "an" and its corresponding definite article "the" as used herein means at least one, or one or more, unless specified otherwise.

It will be appreciated that, except where expressly provided otherwise, all preferences are combinable.

Lactam

A lactam is a cyclic amide. Preferred lactams are γ-lactams which have 5 ring atoms.

Preferably the lactam is of formula (I) or (II):

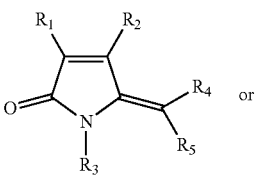

(I)

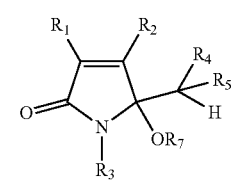

(II)

wherein:
$R_1$ and $R_2$ are each independently selected from hydrogen, halogen, alkyl, cycloalkyl, alkoxy, oxoalkyl, alkenyl, heterocyclyl, heteroaryl, aryl and aralalkyl; and
$R_3$ is selected from hydrogen, hydroxyl, alkyl, cycloalkyl, alkoxy, oxoalkyl, alkenyl, heterocyclyl, heteroaryl, cycloalkyl, aryl, aralalkyl, —C(O)CR$_6$=CH$_2$, and (CH$_2$)$_n$N$^+$(R$^a$)$_3$, where n is an integer from 1 to 16, preferably 2 to 8, and where each R$^a$ is independently H or C$_{1-4}$ alkyl;
$R_4$ and $R_5$ are independently selected from hydrogen, aryl, heterocyclyl, heteroaryl, and arylalkyl; and
$R_6$ is selected from hydrogen and methyl; and
$R_7$ is selected from hydrogen and —C(O)CR$_6$=CH$_2$; and
Preferably, at least one of $R_4$ and $R_5$ is hydrogen.

It will be appreciated that, where appropriate groups may be optionally substituted. Optional substituents may include halogens, C$_{1-4}$alkyl, C$_{1-4}$haloalkyl (for example, CF$_3$) and C$_{1-4}$alkoxy.

Alkyls may, for example, be $C_{1-12}$alkyls, such as $C_{1-6}$alkyls. Aryls may, for example, be $C_{6-10}$aryls, for example, phenyls.

Preferably, at least one of $R_1$ and $R_2$ is selected from heterocyclyl, heteroaryl, aryl and arylalkyl.

Preferably, $R_1$ is hydrogen. Preferably, $R_3$ is hydrogen, or $(CH_2)_nN^+(R^a)_3$, where n is an integer from 1 to 16, preferably 2 to 8, and where each $R^a$ is independently H or $C_{1-4}$ alkyl, more preferably $R^a$ is $CH_3$; Preferably, $R_4$ is hydrogen. Preferably, $R_5$ is hydrogen.

Preferably, $R_6$ is hydrogen. Preferably, $R_z$ is hydrogen. Preferably, $R_2$ is aryl or aralalkyl.

More preferably, $R_2$ is a phenyl group or a substituted phenyl group, for example, a mono-substituted phenyl group. Substitution may be ortho, meta, or para. Preferred substituents include halogen and methyl. For example, and without limitation, $R_2$ may be selected from phenyl, 4-fluorophenyl, 2-fluorophenyl, 4-chlorophenyl, 3-chlorophenyl, 4-bromophenyl and 4-methylphenyl.

More preferably in the lactam of formula (I) or (II), $R_1$, $R_4$ and $R_5$ are H; $R_3$ is H, or $(CH_2)_nN^+(CH_3)_3$, where n is an integer from 1 to 16, preferably 2 to 8; and $R_2$ is a phenyl group, or a mono-substituted phenyl group; preferably $R_2$ is selected from phenyl, 4-fluorophenyl, 2-fluorophenyl, 4-chlorophenyl, 3-chlorophenyl, 4-bromophenyl and 4-methylphenyl.

Even more preferably the lactam is of formula (I), $R_1$, $R_4$ and $R_5$ are H; $R_3$ is H, or $(CH_2)_nN^+(CH_3)_3$, where n is an integer from 1 to 16, preferably 2 to 8; and $R_2$ is a phenyl group, or a mono-substituted phenyl group; preferably $R_2$ is selected from phenyl, 4-fluorophenyl, 2-fluorophenyl, 4-chlorophenyl, 3-chlorophenyl, 4-bromophenyl and 4-methylphenyl.

Where the lactam is cationic in nature, it can be used as such, or suitably with a counterion (e.g. iodide)

Most preferably the lactam is a lactam selected from:

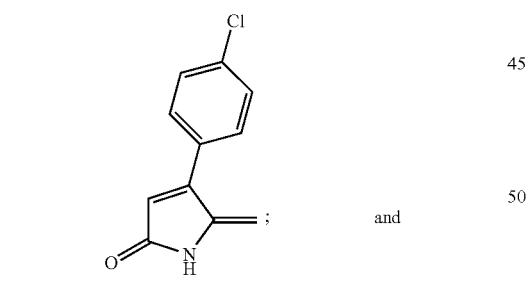

4-(4-chlorophenyl)-5-methylene-pyrrol-2-one;

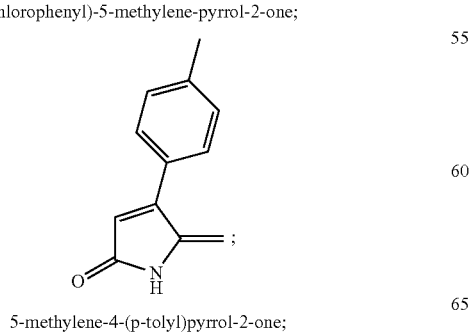

5-methylene-4-(p-tolyl)pyrrol-2-one;

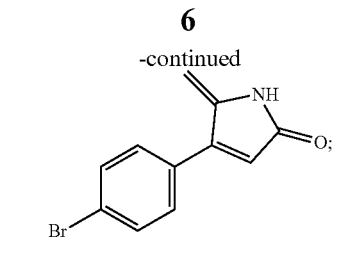

4-(4-bromophenyl)-5-methylene-pyrrol-2-one;

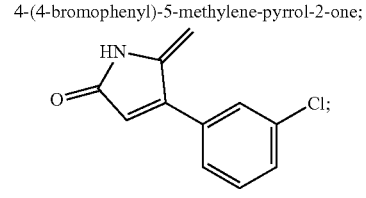

4-(3-chlorophenyl)-5-methylene-pyrrol-2-one;

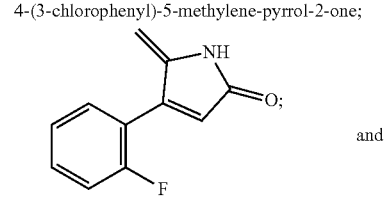

4-(2-fluorophenyl)-5-methylene-pyrrol-2-one;

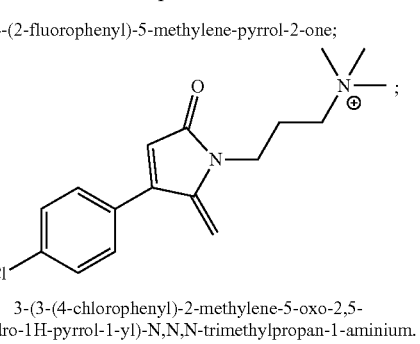

3-(3-(4-chlorophenyl)-2-methylene-5-oxo-2,5-dihydro-1H-pyrrol-1-yl)-N,N,N-trimethylpropan-1-aminium.

The most preferred lactam is a lactam selected from:

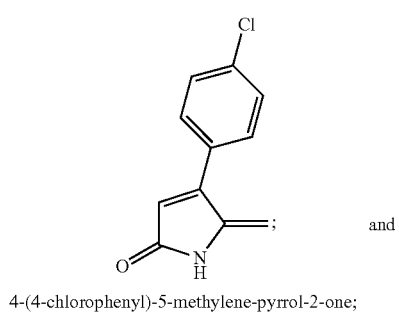

4-(4-chlorophenyl)-5-methylene-pyrrol-2-one;

and

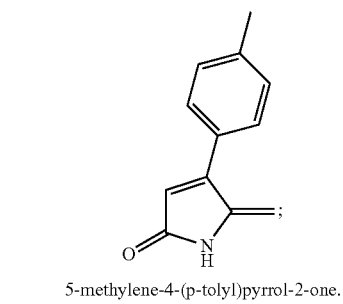

5-methylene-4-(p-tolyl)pyrrol-2-one.

The most preferred lactam is:

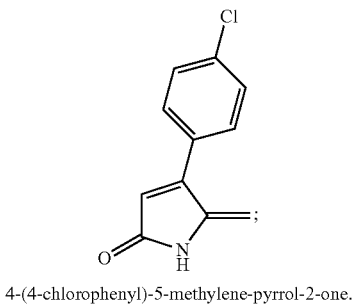

4-(4-chlorophenyl)-5-methylene-pyrrol-2-one.

Where the lactam is cationic in nature, the cation can be used or with a suitable counterion (e.g. iodide).

Levels of Lactam

Preferably the lactam is present at a level of from 0.0001 to 2.5 wt. %, preferably from 0.0001 to 1 wt. %. For example, the lactam may be suitably present at levels of 0.001 to 1 wt. %, or even 0.01 to 1 wt. %, or even 0.01 to 0.5 wt. %.

The lactam levels correspond to ppm as follows, for example, specific levels of lactam being 10 μM, 20 μM, 30 μM, 40 μM, 50 μM, 100 μM, 150 μM, 200 μM would equate to levels of from 2 ppm (10 μM) to 40 ppm (200 μM), and to wt. % of 0.0002 wt. % (10 μM) to 0.004 wt. % (200 μM).

Compositions

Preferably the lactam is delivered from an aqueous based composition, or an organic solvent based composition.

The composition preferably comprises from 0.0002 to 0.1 wt. %, preferably from 0.001 to 0.1 wt. % of a lactam.

Surface

The surface to be treated is selected from metal, plastic or composites.

Photosynthetic Organism

Preferably the photosynthetic organism is prokaryotic or eukaryotic, preferably the prokaryotic organism is cyanobacteria; preferably the eukaryotic organism is algae.

Preferably the photosynthetic organism is algae.

Further Ingredients

The composition may comprise further ingredients such as surfactants, chelating agents, thickeners, pH modifiers. The composition comprising the lactam may be provided in the form of a hydrophobic coating for a surface.

The invention will be further described with the following non-limiting examples.

EXAMPLES

Example 1—Preparation of Examples of Preferred Lactams

Preparation of 4-(4-chlorophenyl)-5-hydroxy-5-methylfuran-2(5H)-one

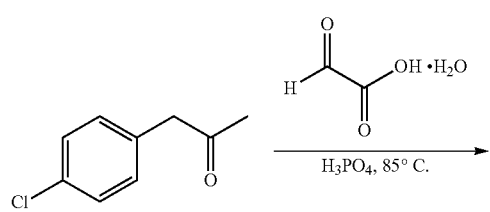

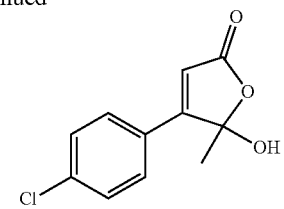

1-(4-Chlorophenyl)propan-2-one (40.00 g, 34.75 mL, 237.2 mmol), glyoxylic acid monohydrate (32.75 g, 355.8 mmol) and phosphoric acid (69.74 g, 711.7 mmol) were combined at room temperature before heating to 85° C. overnight. After cooling to room temperature, the mixture was poured into a mixture of water (500 mL) and ethyl acetate (500 mL). The layers were separated and the aqueous phase extracted with ethyl acetate (500 mL). The combined organic layers were washed with a 1:1 mixture of water and brine (2×500 mL), dried (MgSO$_4$) and concentrated under reduced pressure to yield 4-(4-chlorophenyl)-5-hydroxy-5-methylfuran-2(5H)-one (66.00 g, >100% yield) as a brown oil. The material was used in the next step without further purification.

Preparation of 4-(4-chlorophenyl)-5-hydroxy-5-methyl-1H-pyrrol-2(5H)-one

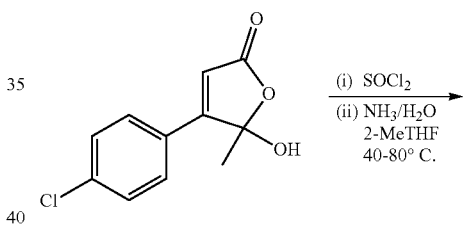

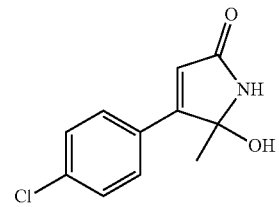

4-(4-Chlorophenyl)-5-hydroxy-5-methylfuran-2(5H)-one (66.00 g, 293.8 mmol) was dissolved in thionyl chloride (196.8 g, 120.0 mL, 1654 mmol) and heated at 40° C. for 1 hour, then 80° C. for 2 hours. The mixture was concentrated under reduced pressure and azeotroped with 2-methyltetrahydrofuran (200 mL). The residue was diluted with 2-methyltetrahydrofuran (160 mL) and this solution added to a cooled stirring mixture of 28% ammonia in water (180 mL) in 2-methyltetrahydrofuran (20 mL) at 0° C. The mixture was warmed to room temperature and stirred overnight. Water (100 mL) and ethyl acetate (200 mL) were added and the layers separated. The aqueous phase was extracted with ethyl acetate (200 mL), and the combined organic extracts dried (MgSO$_4$) and concentrated under reduced pressure. Purification by dry flash column chromatography (5-60% ethyl acetate in heptane) yielded 4-(4-chlorophenyl)-5-hydroxy-5-methyl-1H-pyrrol-2(5H)-one (23.18 g, 35% yield) as a cream coloured solid.

$^1$H NMR (400 MHz, d$_6$-DMSO) 8.55 (brs, 1H), 7.88-7.83 (m, 2H), 7.51-7.46 (m, 2H), 6.37 (d, 1H), 6.32 (s, 1H), 1.45 (s, 3H) UPLC (Basic) 1.51/5.00 min, 100% purity, M+H$^+$ 224 MP 177° C.

Preparation of 4-(4-chlorophenyl)-5-methylene-1H-pyrrol-2(5H)-one

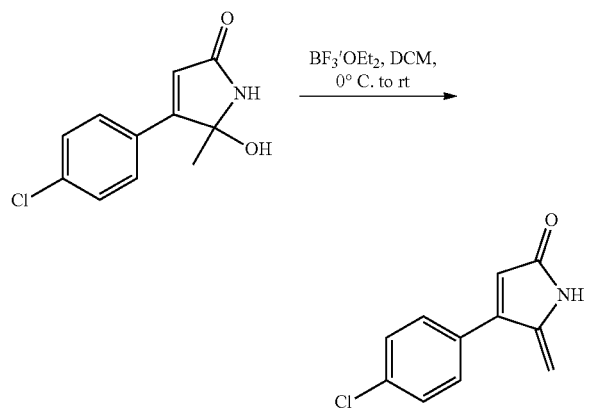

To a cooled solution of 4-(4-chlorophenyl)-5-hydroxy-5-methyl-1H-pyrrol-2(5H)-one (10.00 g, 44.51 mmol) in dry dichloromethane (100 mL) at 0° C. was added a solution of boron trifluoride diethyl etherate (8.213 g, 7.142 mL, 57.87 mmol) in dry dichloromethane (45 mL) over 15 minutes. The mixture was stirred at 0° C., before slowly warming to room temperature and stirring for 2 hours. The reaction was quenched with ice-water (100 mL) and the layers separated. The aqueous layer was extracted with dichloromethane (100 mL), and the combined organic layers washed with a 1:1 mixture of water and saturated aqueous sodium hydrogen carbonate solution (100 mL), dried (MgSO$_4$) and filtered. Silica was added to the filtrate and the mixture stirred for 10 minutes before filtering through a plug of silica, washing through with dichloromethane followed by a 3:1 mixture of dichloromethane:diethyl ether. Fractions containing the desired product were combined and concentrated under reduced pressure. Upon concentration a precipitate formed, which was collected by filtration, washing with diethyl ether, to yield 4-(4-chlorophenyl)-5-methylene-1H-pyrrol-2(5H)-one (5.25 g, 57% yield) as a cream coloured solid.

$^1$H NMR (400 MHz, d$_6$-DMSO) 10.10 (s, 1H), 7.54-7.47 (m, 4H), 6.36 (s, 1H), 5.04 (t, 1H), 4.85 (s, 1H)

UPLC (Basic) 1.87/5.00 min, 100% purity, M+H$^+$ 206 MP 182° C.

Preparation of 5-hydroxy-5-methyl-4-(p-tolyl)furan-2(5H)-one

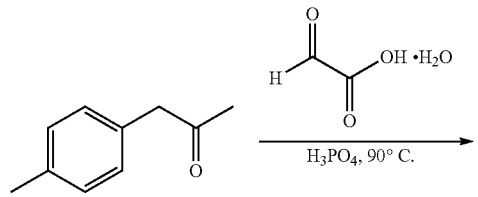

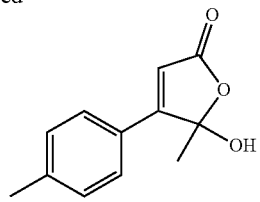

1-(p-Tolyl)propan-2-one (25.00 g, 24.00 mL, 168.7 mmol), glyoxylic acid monohydrate (23.29 g, 253.0 mmol) and phosphoric acid (49.60 g, 506.1 mmol) were combined at room temperature before heating at 90° C. overnight. After cooling to room temperature, the mixture was poured into a stirring mixture of ice-water (400 mL) and ethyl acetate (400 mL). The layers were separated and the organic phase washed with water (100 mL), dried (MgSO$_4$) and concentrated under reduced pressure. The mixture was azeotroped with 2-methyltetrahydrofuran (50 mL) to yield 5-hydroxy-5-methyl-4-(p-tolyl)furan-2(5H)-one (16.50 g, 48% yield) as a brown solid.

$^1$H NMR (400 MHz, d$_6$-DMSO) 7.86 (s, 1H), 7.75 (d, 2H), 7.28 (d, 2H), 6.59 (s, 1H), 2.32 (s, 3H), 1.61 (s, 3H)

Preparation of 5-hydroxy-5-methyl-4-(p-tolyl)-1H-pyrrol-2(5H)-one

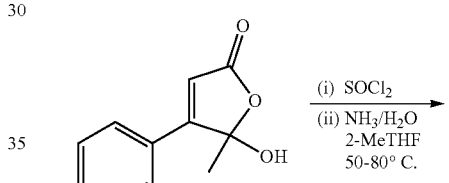

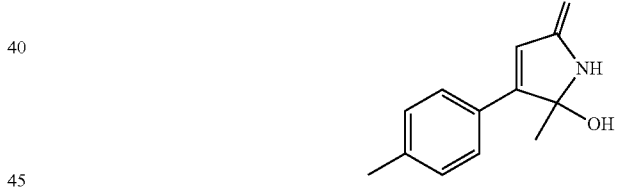

5-Hydroxy-5-methyl-4-(p-tolyl)furan-2(5H)-one (16.50 g, 80.80 mmol) was dissolved in thionyl chloride (48.06 g, 29.47 mL, 404.0 mmol) and heated at 50° C. for 1 hour, before heating at reflux for 1 hour. After cooling to room temperature, the mixture was concentrated under reduced pressure and azeotroped with 2-methyltetra-hydrofuran (2×50 mL). The residue was diluted with 2-methyltetrahydrofuran (60 mL) and this solution added to a cooled stirring mixture of 28% ammonia in water (55 mL, 808.0 mol) in 2-methyltetrahydrofuran (10 mL) at 0° C. The mixture was warmed to room temperature and stirred overnight. 2-Methyltetrahydrofuran was removed under reduced pressure, and the residue diluted with water (200 mL) and diethyl ether (100 mL) and the mixture stirred for 20 minutes at room temperature. The solids were collected by filtration and stirred in water (100 mL) and diethyl ether (50 mL) at room temperature for 10 minutes. The solids were collected by filtration and washed with water, diethyl ether and dried under vacuum at 50° C. to yield 5-hydroxy-5-methyl-4-(p-tolyl)-1H-pyrrol-2(5H)-one (10.49 g, 31% yield) as a light beige solid.

$^1$H NMR (400 MHz, d$_6$-DMSO) 8.44 (brs, 1H), 7.73 (d, 2H), 7.21 (d, 2H), 6.24 (s, 2H), 2.29 (s, 3H), 1.45 (s, 3H)
$^{13}$C NMR (400 MHz, d$_6$-DMSO) 170.4 (s, 1C), 161.1 (s, 1C), 139.8 (s, 1C), 129.7 (s, 2C), 128.9 (s, 1C), 128.2 (s, 2C), 119.1 (s, 1C), 87.8 (s, 1C), 26.7 (s, 1C), 21.5 (s, 1C)
UPLC (Basic) 1.41/5.00 min, 100% purity, M+H$^+$ 204
MP 178° C. Decomposition Preparation of 5-methylene-4-(p-tolyl)-1H-pyrrol-2(5H)-one

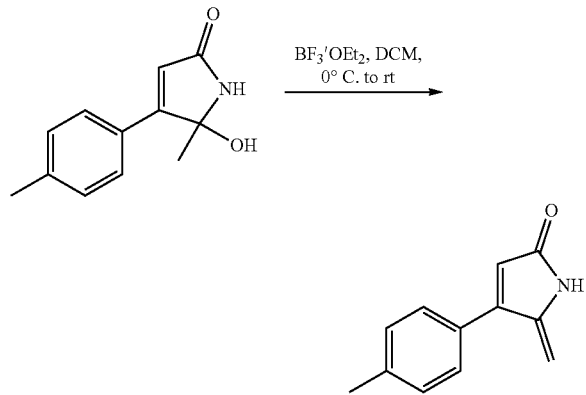

To a cooled solution of 5-hydroxy-5-methyl-4-(p-tolyl)-1H-pyrrol-2(5H)-one (8.68 g, 42.7 mmol) in dry dichloromethane (87 mL) at 0° C. was added a solution of boron trifluoride diethyl etherate (6.85 g, 5.96 mL, 55.5 mmol) in dry dichloromethane (40 mL) over 15 minutes. After 1 hour the mixture was allowed to slowly warm to room temperature. After a further 3 hours, the reaction was diluted with dichloromethane (50 mL) and ice-water (100 mL) and stirred for 10 minutes. The layers were separated and the organic layer washed with water (100 mL), a 1:1 mixture of water and saturated aqueous sodium hydrogen carbonate solution (100 mL) and brine (100 mL) and the organic layer filtered through Celite, washing with dichloromethane. Any excess water was removed by pipette before drying the filtrate (MgSO$_4$) and concentrating under reduced pressure to a brown solid. The solids were stirred in hot dichloromethane (120 mL) for 15 minutes before slowly cooling to room temperature and then 0° C. The solids were collected by filtration to yield 5-methylene-4-(p-tolyl)-1H-pyrrol-2(5H)-one (3.87 g, 49% yield) as a yellow solid. Silica was added to the filtrate and the mixture stirred for 10 minutes before filtering through a plug of silica, washing through with dichloromethane and then a 4:1 mixture of dichloromethane:diethyl ether. The filtrate was concentrated under reduced pressure to yield 5-methylene-4-(p-tolyl)-1H-pyrrol-2(5H)-one (0.58 g, 7%) as a yellow solid. Total yield of 5-methylene-4-(p-tolyl)-1H-pyrrol-2(5H)-one (4.45 g, 56% yield).

$^1$H NMR (400 MHz, d$_6$-DMSO) 10.11 (brs, 1H), 7.35 (d, 2H), 7.25 (d, 2H), 6.25 (s, 1H), 5.01 (s, 1H), 4.85 (s, 1H), 2.31 (s, 3H)
UPLC (Basic) 1.83/5.00 min, 100% purity, M+H$^+$ 186
MP 200° C. Decomposition Example 2—Algal Growth Inhibition by Lactam The lactam used was in these experiments 4-(4-chlorophenyl)-5-methylene-pyrrol-2-one:—

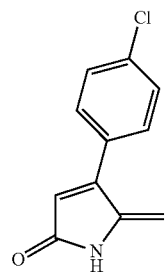

The freshwater algae *Raphidocelis subcapitata* was purchased from Culture Collection of Algae and Protozoa (CCAP 278/4). The algae was cultivated in commercial Gibco BG-11 Media. A bespoke built UV exposure cabinet was used for cultivation. The UV bulbs were replaced by light bulbs (Osram L 8W I535 white). The experiments were performed in sterile 6-well microtiter plates made from polystyrene under static conditions and room temperature. The light-dark cycle was 9 h dark and 15 h light. The quantification was done spectrophotometrically in the 6-well plate by using absorbance measurements. A wavelength scan was done to measure the absorbance maximum of the algaea. The absorbance maximum was found to be at 680 nm. Since the algaea tend to sediment the plate was obitally shaken to bring the cells in suspension before measuring. Measuring was performed using a Varioscan plate reader for microtiter plates.

In this experiment, the algal cultures were treated with lactam at levels of 10 µM to 200 µM as well as two control plates, one untreated, and one treated with solvent (DMSO) only. The specific levels of lactam measured were 10 µM, 20 µM, 30 µM, 40 µM, 50 µM, 100 µM, 150 µM, 200 µM would equate to levels of from 2 ppm (10 µM) to 40 ppm (200 µM), and to wt. % of 0.0002 wt. % (10 µM) to 0.004 wt. % (200 µM). The lactam was provided in a DMSO solvent to the plates. The rate of growth of the algal culture was measured after 12 days by absorbance value. The results are shown in FIG. 1, which shows the various plates at different times up to 12 days, as well as in table 1, which shows the absorbance values taken after 12 days.

TABLE 1

| Test Composition | Absorbance (680 nm) |
| --- | --- |
| Untreated Control | 1.1 |
| DMSO Control | 0.7 |
| 10 µM | 0.1 |
| 20 µM | 0.1 |
| 30 µM | 0.1 |
| 40 µM | 0.1 |
| 50 µM | 0.1 |
| 100 µM | 0.1 |
| 150 µM | 0.1 |
| 200 µM | 0.1 |

This experiment shows that the lactam level of 10 µM (equating to 0.0002 wt. %) and above provides very effective algal growth inhibition Example 3—Algal Growth Inhibition by Lactam The lactam used was in these experiments 4-(4-chlorophenyl)-5-methylene-pyrrol-2-one:—

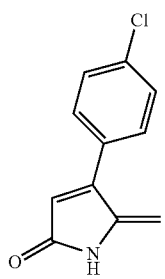

The freshwater algae *Raphidocelis subcapitata* was purchased from Culture Collection of Algae and Protozoa (CCAP 278/4). The algae was cultivated in commercial Gibco BG-11 Media. A bespoke built UV exposure cabinet was used for cultivation. The UV bulbs were replaced by light bulbs (Osram L 8W I535 white). The experiments were performed in sterile 6-well microtiter plates made from polystyrene under static conditions and room temperature. The light-dark cycle was 9 h dark and 15 h light. The quantification was done spectrophotometrically in the 6-well plate by using absorbance measurements. A wavelength scan was done to measure the absorbance maximum of the algaea. The absorbance maximum was found to be at 680 nm. Since the algaea tend to sediment the plate was obitally shaken to bring the cells in suspension before measuring. Measuring was performed using a Varioscan plate reader for microtiter plates.

Figure 2:
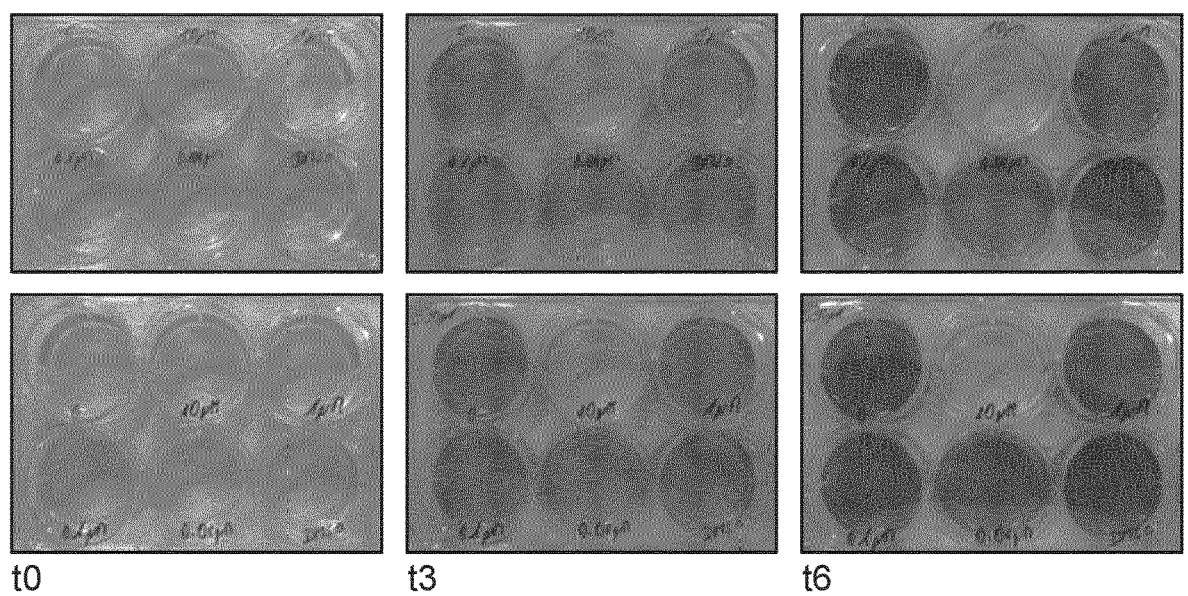
FIG. 2 relates to example 3 and is a picture combining photographs of algal cultures at 0, 3 and 6 days for the specific levels of lactam of 0.01 μM, 0.1 μM, 1 μM, and 10 μM, as well as the untreated control and DMSO control.

In this experiment, the algal cultures were treated with lactam at levels of 0.01 µM to 10 µM as well as two control plates, one untreated, and one treated with solvent (DMSO) only. The specific levels of lactam measured were 0.01 µM, 0.1 µM, 1 µM, 10 µM, this would equate to levels of from 0.002 ppm also defined as 2 ppb (0.01 µM) to 2 ppm (10 µM), and to wt. % of 0.0000002 wt. % (0.01 µM) to 0.0002 wt. % (10 µM). The lactam was provided in a DMSO solvent to the plates. The rate of growth of the algal culture was measured after 6 days by absorbance value. The results are shown in FIG. 2, which shows the various plates at different times up to 6 days (t0, t3 and t6 days), as well as in table 2, which shows the absorbance values taken after 6 days.

TABLE 2

| Test Composition | Absorbance (680 nm) |
|---|---|
| Untreated Control | 1.0 |
| DMSO Control | 0.9 |
| 0.01 µM | 0.8 |
| 0.1 µM | 0.9 |
| 1 µM | 0.9 |
| 10 µM | 0.1 |

This experiment shows that the lactam level of 10 µM (equating to 0.0002 wt. %) and above provides very effective algal growth inhibition. When the amount of lactam was 10× lower (at 1 µM) no algal growth inhibition was seen. This was also the case when the lactam amount was even lower.

The invention claimed is:

1. A method of treatment of a surface to improve the resistance of the surface to fouling from a photosynthetic organism which is prokaryotic or eukaryotic, the method comprising:
    treating a surface prone to fouling from a photosynthetic organism which is prokaryotic or eukaryotic with a composition comprising a lactam, wherein the composition is a hydrophobic coating and comprises from 0.0001 to 5 wt % of a lactam;
    wherein the surface to be treated is selected from plastic or composites; and,
    wherein the lactam is:

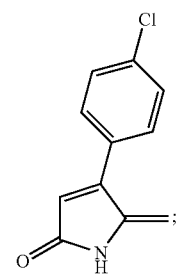

4-(4-chlorophenyl)-5-methylene-pyrrol-2-one.

2. The method according to claim 1, wherein the lactam is present at a level of from 0.0001 to 2.5 wt %.

3. The method according to claim 1, wherein the photosynthetic organism is algae.

4. The method according to claim 1, wherein the lactam is delivered from an aqueous based composition, or an organic solvent based composition.

5. A method of inhibiting growth of a photosynthetic organism which is prokaryotic or eukaryotic on a surface, wherein the surface is selected from plastic or composites, the method comprising:
    treating the surface with a hydrophobic composition including a lactam, wherein the lactam is:

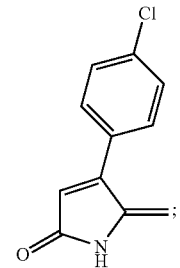

4-(4-chlorophenyl)-5-methylene-pyrrol-2-one.

6. The method according to claim 5, wherein the photosynthetic organism is algae.

* * * * *